United States Patent
Umapathy et al.

(10) Patent No.: US 9,449,181 B1
(45) Date of Patent: Sep. 20, 2016

(54) CONTROL AND ENFORCEMENT OF ACCESS OF USER DATA

(71) Applicant: Google Inc., Mountain View, CA (US)

(72) Inventors: Vijay Umapathy, Sunnyvale, CA (US); Michael Bachman, Sunnyvale, CA (US); Alejo Grigera, San Francisco, CA (US); Vitor Rodrigues, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/656,065

(22) Filed: Oct. 19, 2012

(51) Int. Cl.
  *G06F 21/62* (2013.01)
  *G06F 21/00* (2013.01)

(52) U.S. Cl.
  CPC ............... *G06F 21/62* (2013.01); *G06F 21/00* (2013.01)

(58) Field of Classification Search
  CPC ........ G06F 21/00; G06F 21/30; G06F 21/31; G06F 21/51; G06F 21/10–21/14; G06F 21/62–21/629
  See application file for complete search history.

(56) References Cited

U.S. PATENT DOCUMENTS

| | | | | |
|---|---|---|---|---|
| 2002/0143943 | A1* | 10/2002 | Lee | G06F 21/41 709/225 |
| 2004/0117322 | A1* | 6/2004 | Bjorksten et al. | 705/80 |
| 2004/0199787 | A1* | 10/2004 | Hans | G06Q 20/341 726/27 |
| 2009/0064038 | A1* | 3/2009 | Fleischman et al. | 715/810 |
| 2009/0070412 | A1* | 3/2009 | D'Angelo | G06Q 10/10 709/203 |
| 2012/0254142 | A1* | 10/2012 | Knowlton | G06T 11/206 707/705 |
| 2013/0019291 | A1* | 1/2013 | Zou | H04L 63/08 726/6 |
| 2013/0055357 | A1* | 2/2013 | Etchegoyen | 726/4 |
| 2013/0055411 | A1* | 2/2013 | Yang | H04W 12/08 726/30 |
| 2013/0060679 | A1* | 3/2013 | Oskolkov et al. | 705/39 |
| 2013/0067388 | A1* | 3/2013 | Celie et al. | 715/781 |
| 2014/0090091 | A1* | 3/2014 | Prakash | G06F 21/6245 726/30 |
| 2014/0359783 | A1* | 12/2014 | Vera | G06Q 10/10 726/26 |
| 2015/0135261 | A1* | 5/2015 | Park | H04L 63/102 726/1 |

* cited by examiner

*Primary Examiner* — Matthew Smithers
(74) *Attorney, Agent, or Firm* — Procopio, Cory, Hargreaves & Savitch LLP (57) ABSTRACT

Control and enforcement of access of user data are described, including receiving a request from an application to access data associated with a user; determining that a service profile and another service profile are associated with the user, the service profile includes at least one data service specified by the user and the another service profile includes at least another data service specified by the user; identifying the service profile being associated, by the user, with at least the application; determining whether the data requested by the application are provided by the at least one data service included in the service profile; and performing an action with respect to access by the application to the data requested, based on a result of the determining.

21 Claims, 9 Drawing Sheets

CONTROL AND ENFORCEMENT OF ACCESS OF USER DATA

BACKGROUND

Users may have accounts associated with different parties. For example, a user may have a social network account, an online shopping account, and an e-mail account, with each account being associated with a different party. The user may benefit from sharing the user's data from one account with another account. For example, sharing the user's online shopping data with the user's social network may lead to the user being offered shopping promotions or coupons based on the user's shopping data.

However, once a user shares data from his or her account with a third-party account (e.g., a third-party application), the user (a second party) may not know what information from the first-party account is being accessed and used by the third-party account. The user may not know how or when the third-party account accesses or uses the user's data from the first-party account.

SUMMARY

The subject matter discussed herein relates generally to data processing and, more particularly, to the control and enforcement of access of user data.

Control and enforcement of access of user data are described, including receiving a request from an application to access data associated with a user; determining that a service profile and another service profile are associated with the user, the service profile includes at least one data service specified by the user and the another service profile includes another at least one data service specified by the user; identifying the service profile has been associated, by the user, with at least the application; determining whether the data requested by the application are provided by the at least one data service included in the service profile; and granting access by the application to the data requested when the data requested by the application are provided by the at least one data service; or denying access by the application to the data requested when the data requested by the application are not provided by the at least one data service.

In some implementations, another service profile may be associated with at least another application, which is mutually exclusive from the at least the application associated with the service profile.

In some implementations, the request may be received by intercepting the request intended for a target not performing the interception.

In some implementations, the service profile is identified based on an identifier associated with the at least the application.

In some implementations, the service profile is identified from a cache.

In some implementations, the at least one data service includes one or more boundaries defined by the user and can be redefined by the user.

In some implementations, the request may be granted by passing through the request from the application to a server controlling access to the data requested.

In some implementations, an error code may be returned to the application when the request is denied.

The subject matter discussed herein provides one or more advantages. One advantage may be providing the user with transparency with respect to access of user data, as well as an ability for the user to control and enforce access of user data.

DETAILED DESCRIPTION

The subject matter described herein is taught by way of example embodiments. Various details have been omitted for the sake of clarity and to avoid obscuring the subject matter. Examples shown below are directed to structures and functions for implementing and enabling control and enforcement of access of user data.

Described herein are example embodiments of systems, devices, and methods that enable user control and enforcement of access to user data and services by other applications (e.g., third-party applications).

Data associated with users can be classified into categories (e.g., email data, video data, social network data, etc.). A user may be provided a mechanism (e.g., user interface) to define one or more service profiles, and each of the service profiles may include one or more categories of data. The user may decide which applications to associate with the service profiles. Once an application (e.g., a third-party application) is associated with a service profile, the application may access the categories of data included in the service profile and may not access any category of data not included in the service profile.

For example, a user may define a service profile "Recommendation Services," to which the user may identify and add categories of data, such as data from location data service, social network data, and data from authenticated search (e.g., to personalize the user experience and search results). The user may control access by applications (e.g., third-party applications) to data associated with the user. For example, the user may create and/or modify a service profile to, for example, turn on and off a category of data; add, modify, or delete one or more applications (e.g., third-party applications) associated with the service profile; and/or perform other configurations of the service profile.

When an application (e.g., third-party application) requests access to data associated with a user, the access request may be checked against a service profile, with which the application is associated, to determine whether the application has access to the user data. For example, if the application requests access to the user's e-mail data, and the service profile defines that access to the user's e-mail data is allowed by the application, the application is granted access to the user's e-mail data. If, however, the service profile does not define that the user's e-mail data are a category of data the application is allowed to access, the application is denied access to the user's e-mail data.

As used herein, the term "product" or "service" or "application" refers to any information, data, communication, infrastructure, organization, service, assistance, entertainment, or the like provided by one or more providers via online communication to at least one user. Examples of products, services, or applications may include, but are not limited to, online searching, e-commerce services, maps, locational data, dating services, online forums, online platforms, bulletin boards, social networks, websites, sites, chat rooms, email communication, image sharing sites, video sharing sites, audio sharing sites, data sharing platforms, data storage, software, tax preparation and filing, gaming, mobile applications, news, translation, toolbar, calendar, instant messaging, short message service, voice, phone, video communication service, and the like. Products, services, or applications may be provided on any platform or device ranging from a mobile device (e.g., smartphone), to a semi-mobile device (e.g., a laptop), and to a non-mobile device (e.g., a kiosk, television, computer, etc.). A product, service, or application may communicate to a provider or another product, service, or application using a wired or wireless connection.

As used herein, the term "website" or "web site" or "site" refers to a set of web pages for providing or supporting related services. A website can be hosted on at least one computing device (e.g., a system, server, web server, application server, client, or any label) accessible via a network or connection (wired and/or wireless). A website can be accessed and/or supported using at least one top-level Uniform Resource Locator (URL, e.g., "abc.gov", "123.org", "zxc.com", "bestads.com", "virtualbank.com", and the like). A website can be operated and/or supported by one or more business entities. For example, ZXC Corporation may operate the website "zxc.com" that includes web pages, content, and/or services from "zxc.bestads.com" (e.g., advertisement services provided by another firm) and "virtualbank.com/zxc-payment-services" (e.g., financial services provided by a financial institution).

As used herein, the term "online account" or "account" refers to a product, service, or application associated with a user. A user may have, subscribe to, and/or use one or more accounts or online accounts (e.g., a user may have an email account, a social network account, a photo sharing account, a video sharing account, an online storage account, a mobile account, a blog account, etc.). Each of the email service, social network, photo sharing service, video sharing service, online storage, mobile service, etc. can be referred to as a product, service, or application.

An account can be an Internet or external account (e.g., an end user subscribing to an openly, publicly, or semi-publicly available service), an intranet or internal account (e.g., an employee subscribing to a service of a company or firm), an extranet or controlled availability account (e.g., an account available to vendors, customers, or other controlled subscribers), or another type of account.

As used herein, the term "category" or "type" with respect to data associated with a service profile refers to the grouping of data and services by a user. A category of data may come from a service (e.g., email service), a part of a service (e.g., only emails to and from some users or email addresses), or a combination of two of more services (e.g., the combination of at least a part of one service, such as email services, with at least a part of another service, such as calendar service or contracts management service). For example, in one service profile, a user may define or group incoming emails as "email data" (excluding outgoing emails). In another service profile, a user may define outgoing emails as "email data" (excluding incoming emails). In yet another service profile, a user may define all emails (e.g., incoming and outgoing emails) as "email data". In any of these example groupings of "email data," or in any other example, a user may include some or all of the user's address book contacts as part of "email data." To further illustrate, a user may define a "media" category of data in different service profiles to include different combinations of one or more of audio data, video data, photo data, the metadata thereof, and literal data.

As used herein, a category of data may be referred to as data, user data, user's data, data stream, service data, service, data service, or the like.

FIG. 1 shows a data flow diagram of an example implementation. Environment 100A includes an access manager 110, at least one third-party application 120, an access information manager 130, a device 160, and data/services manager 180. A third-party application can be referred to as a third-party service or a third-party product. Third-party application 120 is only an example of an application, service or product that requests and/or uses data and/or service provided by another application, service or product. In place of third-party application 120 may be any application, service or product from any party (e.g., first party).

Figure 1A:
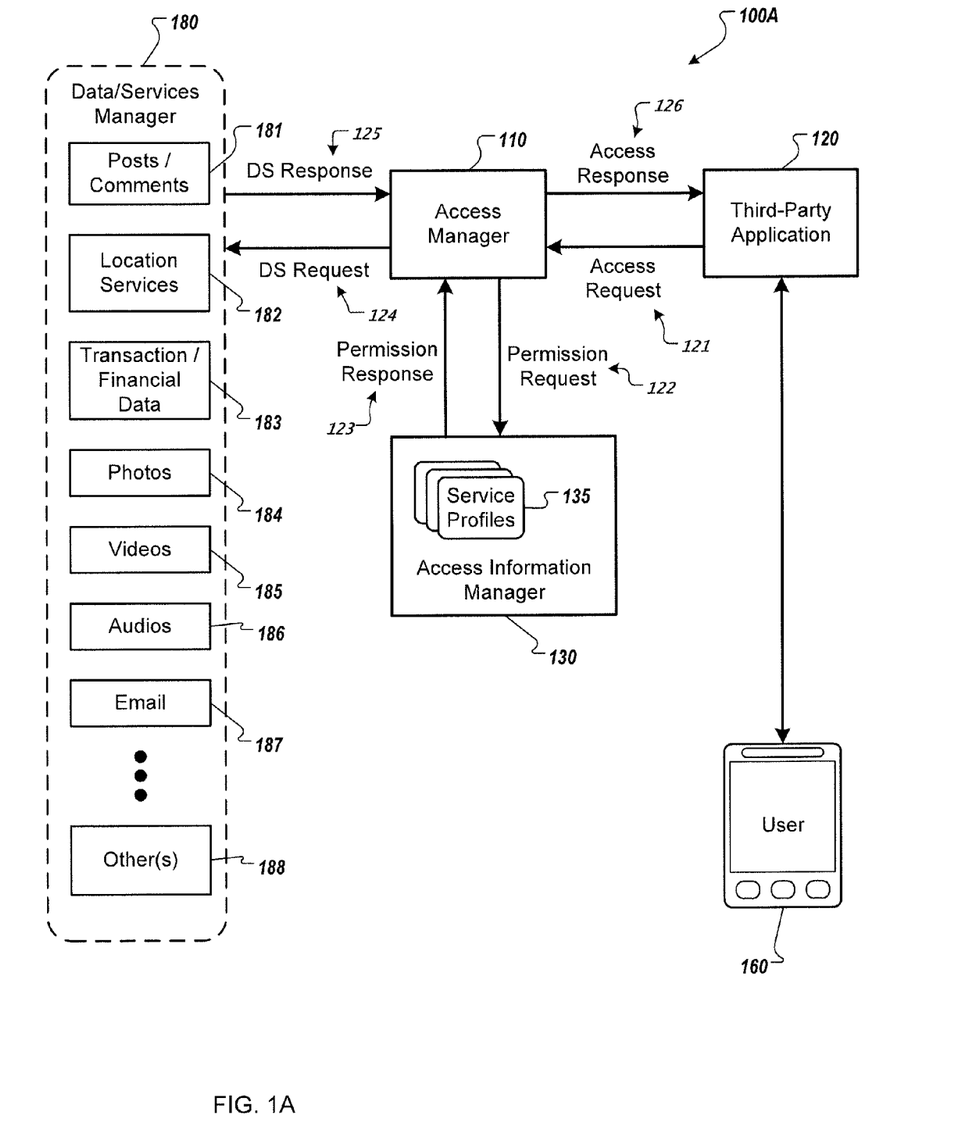
FIGS. 1A-D show data flow diagrams of example implementations of systems and methods.

Data/services manager 180 may include and/or manage, for example, posts/comments data 181 (e.g., associated with a social network), location services 182, transaction/financial data 183, photo data 184, video data 185, audio data 186, email data and service 187, and other data and services 188 (e.g., users profile data and/or other data/services). Service 170 may be a social network that produces and stores posts/comments data 181, which includes users' posts, comments, and other data associated with users on a social network (e.g., contact information, circles, etc.). Photo data 184, video data 185, and/or audio data 186 (e.g., user-provided or user-interested photos, videos, and audios) may be stored by social network service 170 and/or other media sharing/storing (e.g., cloud storing) services (not shown).

Access manager 110 may be operated to protect access to a user's data from third-party applications (e.g., guarding against unauthorized access to the user's data). For example, a user (e.g., a user using device 160) may have granted a third-party (e.g., third-party application 120) access to some of the user's data and/or services (e.g., managed by data/services manager 180) which are not associated with the third-party. A user's data may be referred to as a data stream.

When third-party application 120 needs to access any data or services associated with the user from data/services manager 180, the third-party application 120 may issue an access request 121. Access manager 110 receives the access request 121. To determine whether to grant access request 121, access manager 110 may consult access information manager 130 or one or more service profiles 135 (described in FIG. 1B below).

In some implementations, the access request 121 is not intended for access manager 110. Access manager 110 intercepts the access request 121 on behalf of its intended target. Intercepting access requests may provide advantages of not having to change the existing data processing system while providing the ability to control and enforce access of user data (e.g., without changing the executable instructions running on the intended target of the access requests).

For example, access manager 110 may send a permission request 122 to access information manager 130. The permission request 122 may include a User ID associated with the user and/or a Service ID associated with the third-party application 120. Access information manager 130 may identify one or more service profiles 135 based on the User ID and/or Service ID. The service profiles may include at least one category of data accessible by the third-party application 120. Access information manager 130 returns the identified service profiles 135 to access manager 110 in, for example, a permission response 123.

In some implementations, such as in implementations where permission request 122 includes the user data and/or type of user data to be accessed, access information manager 130 may return an answer (e.g., a status code) in permission response 123 based on the user data and/or type of user data to be accessed. The answer may be derived from determining whether the data to be accessed have been categorized (e.g., defined) in at least one of the identified service profiles 135. The answer, in an implementation, may indicate that "the access is granted" or "the access is denied." The answer may be returned in addition to or in place of one or more service profiles 135 as described above.

Access manager 110 may then determine whether to grant the access request 121 based on the permission response 123. For example, if access manager 110 receives one or more service profile 135 (e.g., the access information manager 130 has not made an access grant/deny determination), access manager 110 uses the service profiles 135 to determine whether the data to be accessed have been categorized (e.g., defined) in at least one of the identified service profile 135.

If the access request 121 is granted, access manager 110 issues data/service (DS) request 124 to data/services manager 180 (e.g., one or more servers (not shown) that manage user data and services). The DS request 124 may include the necessary information (e.g., User ID, Service ID, user data and/or type of user data to be accessed, etc.) to allow the one or more servers to respond. In implementations where the access request 121 is intercepted, the access request 121 can be passed through as DS request 124.

DS response 125 from data/services manager 180 to access manager 110 may be passed through as access response 126 to third-party application 120. In some implementations, access manager 110 may formulate, based on DS response 125, an access response 126 and send the access response to the third-party application 120.

If the access request 121 is denied for any reason (e.g., access to user data by the third-party application 120 is not granted or has been revoked), access manager 110 may ignore the access request 121 (e.g., not returning an access response 126). In some implementations, access manager 110 may return a status or error code in an access response 126.

The access flow illustrated with access request 121, permission request 122, permission response 123, DS request 124, DS response 125, and access response 126 is only an example flow (121-122-123-124-125-126). Environment 100A may support many access flow variations. For example, access manager may be implemented to have "knowledge" of some service profiles 135 and/or information previously received from data/services manager 180. The knowledge may be, for example, in a form of information caching.

For example, access manager 110 may cache previous permission responses 123 and use the cached permission responses 123 to determine whether to grant or deny subsequent access requests 121 without sending a permission request 122 every time an access request 121 is received (e.g., 121-124-125-126 flow). An access flow of 121-124-125-126 may affect performance of the flow, responsiveness of user experience, and lightening of the load of access information manager 130.

In a 121-124-125-126 flow, when an access request 121 is, for example, a repeat request or a request similar to a previous request, to which a permission response 123 has been received and cached, access manager 110 may determine that a new permission response 123 based on the access request 121 would be the same or similar to a previously received permission response 123. In that case, without sending a new permission request 122 and waiting for a corresponding permission response 123, access manager 110 may determine whether to grant or deny the access request 121 based on the previously received permission response 123.

Some or all of the cashed permission responses 123 may be purged, for example, periodically (e.g., X number of minutes or every Y number of hours, etc.) and/or when access information manager 130 notifies access manager 110 that one or more service profiles 135 have been updated.

In some implementations, access manager 110 may cache previous DS responses 125 for responding to subsequent access requests 121 without sending a permission DS request 124 every time an access request 121 is received (e.g., 121-122-123-126 flow). An access flow of 121-122-123-126 may affect performance of the flow, responsiveness of user experience, and lightening of the load of data/services manager 180.

In a 121-122-123-126 flow, when an access request 121 is, for example, a repeat request or a request similar to a previous request, to which a DS response 125 has been received and cached, access manager 110 may determine that a new DS response 125 based on the access request 121 would be the same or similar to a previously received DS response 125. In that case, without sending a new DS request 124 and waiting for a corresponding DS response 125, access manager 110 may formulate an access response 126 based on one or more previously received DS response 125.

Some or all of the cached DS responses 125 or data contained therein may be purged, for example, periodically (e.g., X number of minutes or every Y number of hours, etc.) and/or when data/services manager 180 notifies access manager 110 that one or more previously sent DS responses 125 or data contained therein are out updated (e.g., data contained therein have been updated).

To further improve performance, some implementations may combine the benefits of data flows 121-124-125-126 and 121-122-123-126 to arrive at a data flow of 121-126. For example, access manager 110 may provide the same access response 126 in response to a repeat access request 121. A data flow of 121-126 provides an added feature of shielding access information manager 130 and data/services manager 180 from repeat requests, which can be malicious, such as in denial of service attacks.

An access manager 110 may be implemented in any manner and/or using any structure. For example, in some implementations, access manager 110 may be a central server that receives or intercepts all accesses of user data by all third-party applications 120. In other implementations, access manager 110 may be deployed in a distributed manner. For example, there may be two or more access managers 110 for load balancing the accesses by third-party applications 120. In further implementation examples, one or more access managers 110 may be dedicated to serve one or more specific third-party applications 120. The combination of the above implementation examples and other examples not described may be used to deploy access manager(s) 110.

A third-party application 120 may be any product, service, application, website, account, etc. provided by a third-party. As used herein, the term "third party" refers to a party that is not a user (second party) of a service or a party that provides data and services managed by data/services manager 180 (first party).

Access information manager 130 may be implemented, as shown, separated from manager 110 and data/services manager 180. In some implementations, access information manager 130 may be implemented as part of access manager 110 and/or part of data/services manager 180. Access information manager 130 may be implemented in any manner and/or using any structure. For example, access information manager 130 may be implemented as a central server, two or more distributed servers, two or more dedicated servers, and/or any combination thereof. Access information manager 130 is further described in FIG. 1B below.

A user may access one or more third-party applications using device 160. A device 160 may be any device, such as a telephone, smartphone, tablet computing device, laptop, desktop computer, television, a device in a vehicle, etc.

Data/services manager 180 may include one or more data stores, devices, and/or servers that provide one or more data streams and/or services controlled by a party that is not a user or a third party. A user has a relationship with the party that controls and/or manages data/services manager 180, and a separate relationship with the party that provides the third-party application 120). Data/services manager 180 is further described in FIG. 1C below.

Figure 1B:
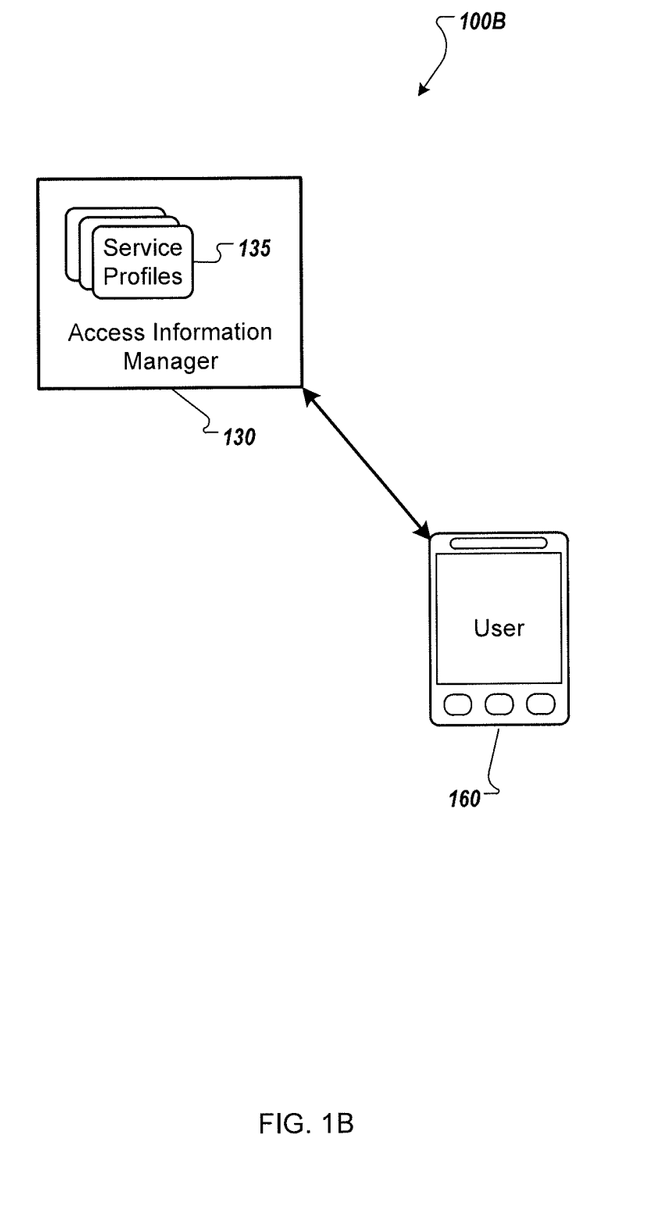

FIG. 1B shows a data flow diagram that involves device 160 and access information manager 130. A user using device 160 may interact with access information manager 130 to create, define, view, modify, and/or delete one or more service profiles 135. Access information manager 130 may provide a mechanism, such as a user interface, for the user to manage service profiles 135. Example user interfaces on described in FIGS. 2 and 3 below.

Figure 1C:
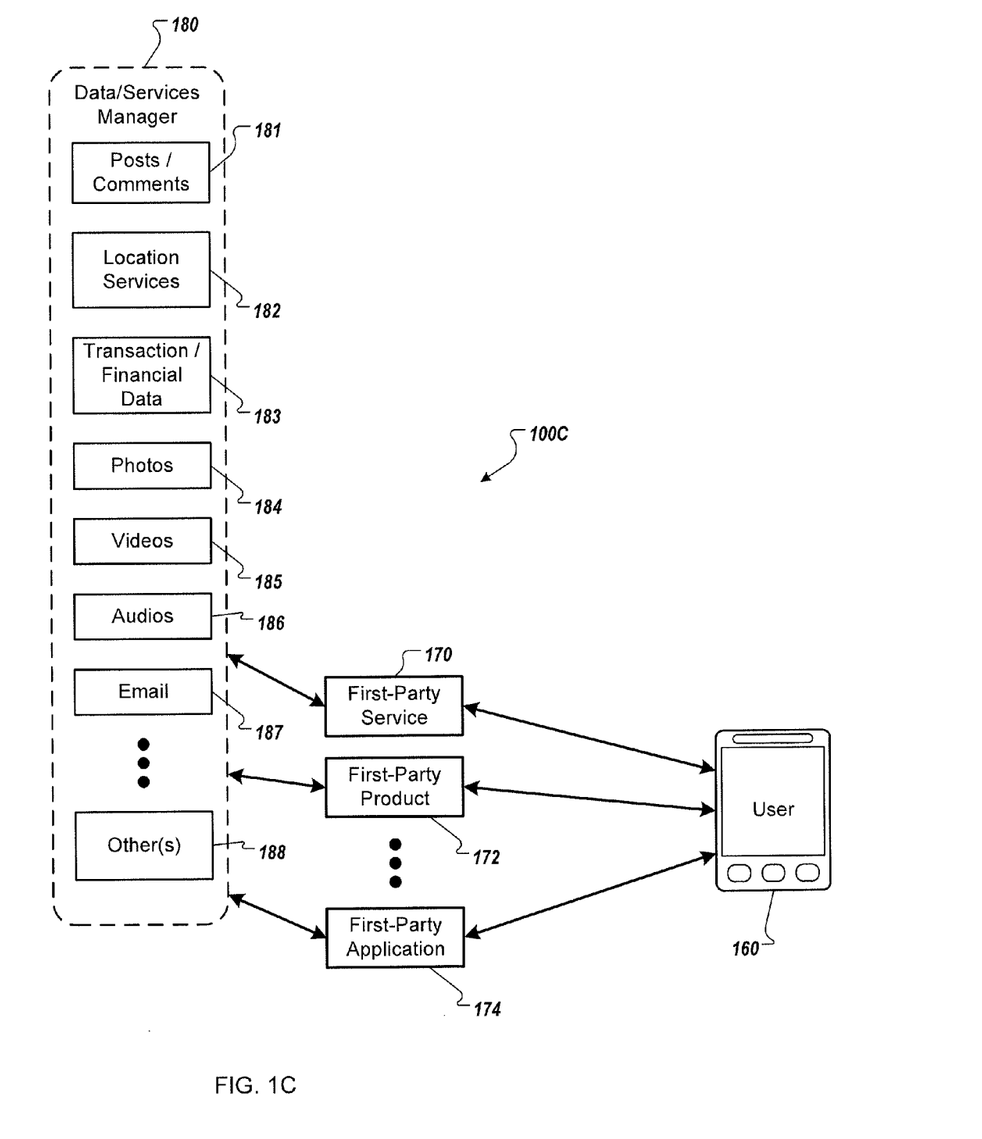

FIG. 1C shows an example relationship between a user and the data/services manager 180, and the data and services associated with the relationship. A user may use device 160 to access services provided by data/services manager 180, such as service 170 (e.g., a website), product 172, and application 174 (e.g., an application server). Service 170, product 172, and application 174 (and other services, not shown) generate data and provide services represented by the conceptual boxes in data/services manager 180.

Product 172 may be an email product (e.g., email client and associated services) that produces and stores email data 187. One or more transaction/financial services (e.g., online shopping, personal finance/planning, etc., not shown) may produce, store, and/or use transaction/financial data 183, which are associated with users.

Application 174 may be services associated with an application (an "App") installed on and executed on device 160. For example, the App may be a Global Positioning System (GPS) application that provides a user's GPS or locational data, which can be used to locate or identify the user. For example, the App on device 160 may provide the user's location data to application 174, which may provide the user's location data via location services 182 to, for example, a third-party application 120 or another app or service (e.g., a weather app that needs the user's location data to provide weather forecasts for the user's location).

Data streams and/or services in Data/services manager 180 are made available through service profiles 135 to third-party applications and applications across different platforms and across different functions. Transparent to a single third-party application, the third-party application is permitted to make specific uses of different types or categories of user data that are all connected to the same user, who may have one or more than one account with the data/services manager 180.

Figure 1D:
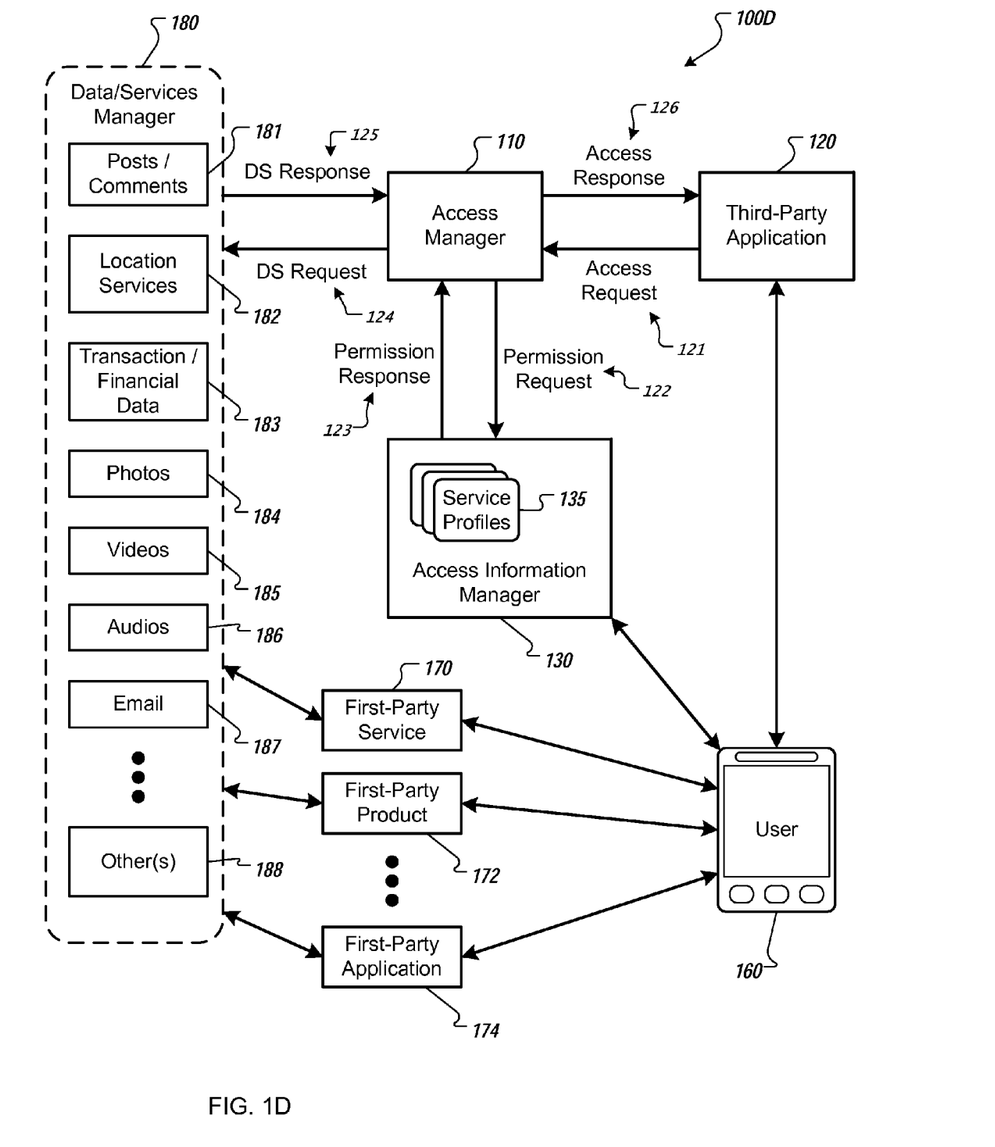

FIG. 1D shows the combination of FIGS. 1A-C. Access manager 110 and/or access information manager 130 may be operated by the data/services manager 180, the third party, or another party. Data/services manager 180 stores and provides data associated with the user. In some implementation, data/services manager 180 may also store and provide data associated with another party that is not the third party.

Figure 2:
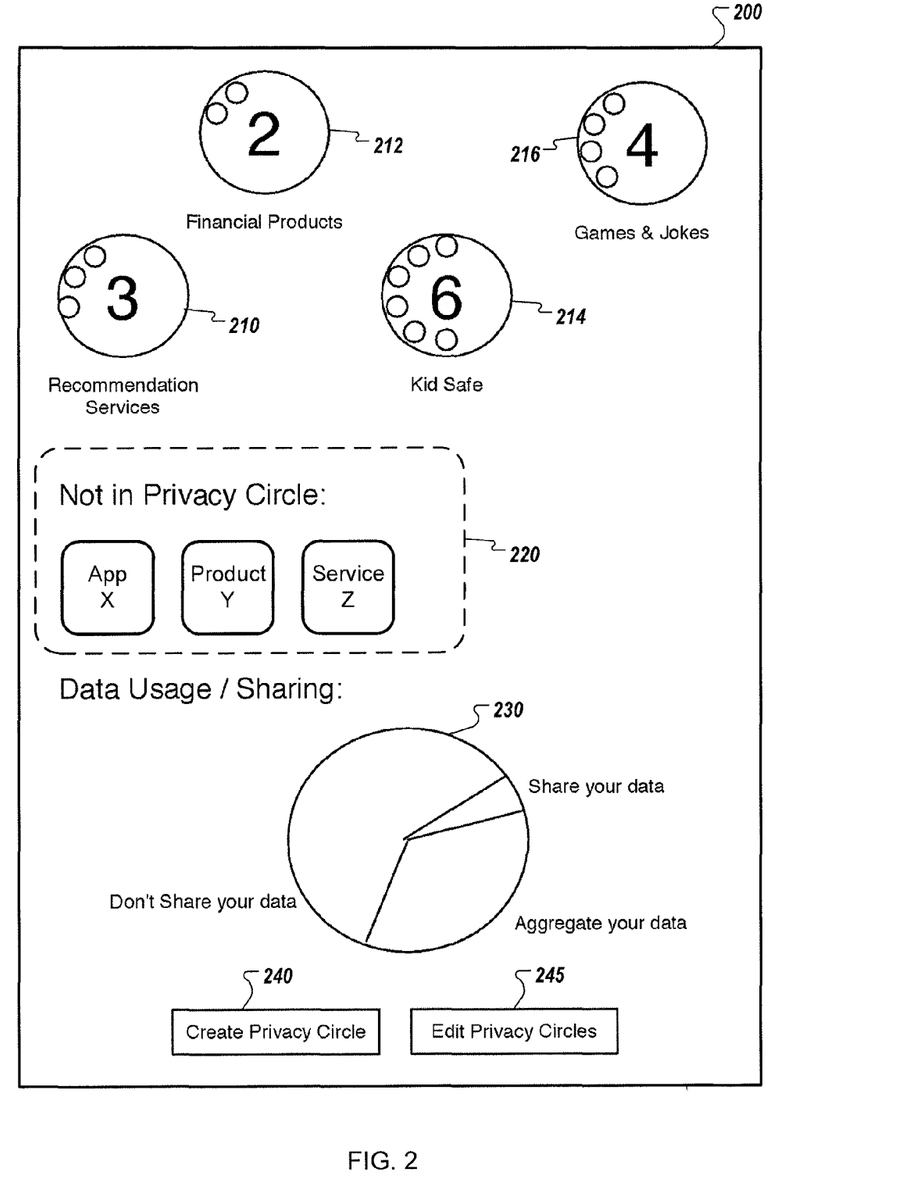
FIG. 2 shows an example user interface for managing service profiles.

FIG. 2 shows an example user interface for managing service profiles. In this example, service profiles may be created with consideration of a user's privacy, and the service profiles may be called privacy circles. User interface (UI) 200 is shown with four privacy circles 210-216 (e.g., service profiles). Each privacy circle may have a label. For example, a privacy circle 210 is shown with a label "Recommendation Services." In some implementations, privacy circle may have other visual indicators. For example, privacy circle 210 is shown with three small circles and a number "3" to indicate that three third-party applications have been associated with this privacy circle.

User interface 200 may show third-party applications 220 that are not in any of the privacy circles 210-216 (e.g., these third-party applications 220 have not been associated with any of the privacy circles 210-216). UI 200 may show other information 230. An object such as a button 240 may be used to create a privacy circle (e.g., privacy circles 210-216 may be created initially by pressing this button). An object such as a button 245 may be pressed to initiate editing any of the privacy circles 210-216. For example, to edit the "Recommendation Services" privacy circle 210, that privacy circle may be clicked on to show that it has been selected. Then, button 245 may be clicked on to start editing the selected privacy circle 210.

After defining a service profile or privacy circle (described in FIG. 3 below), a user can associate a third-party application with the service profile by, for example, dragging a visual symbol that represents the third-party application (e.g., as shown in area 220) over another visual symbol that represents the service profile (e.g., privacy circles 310-216). In some implementations, the dragging may be performed in the reverse direction (e.g., drag privacy circle 212 over App X 220).

Figure 3:
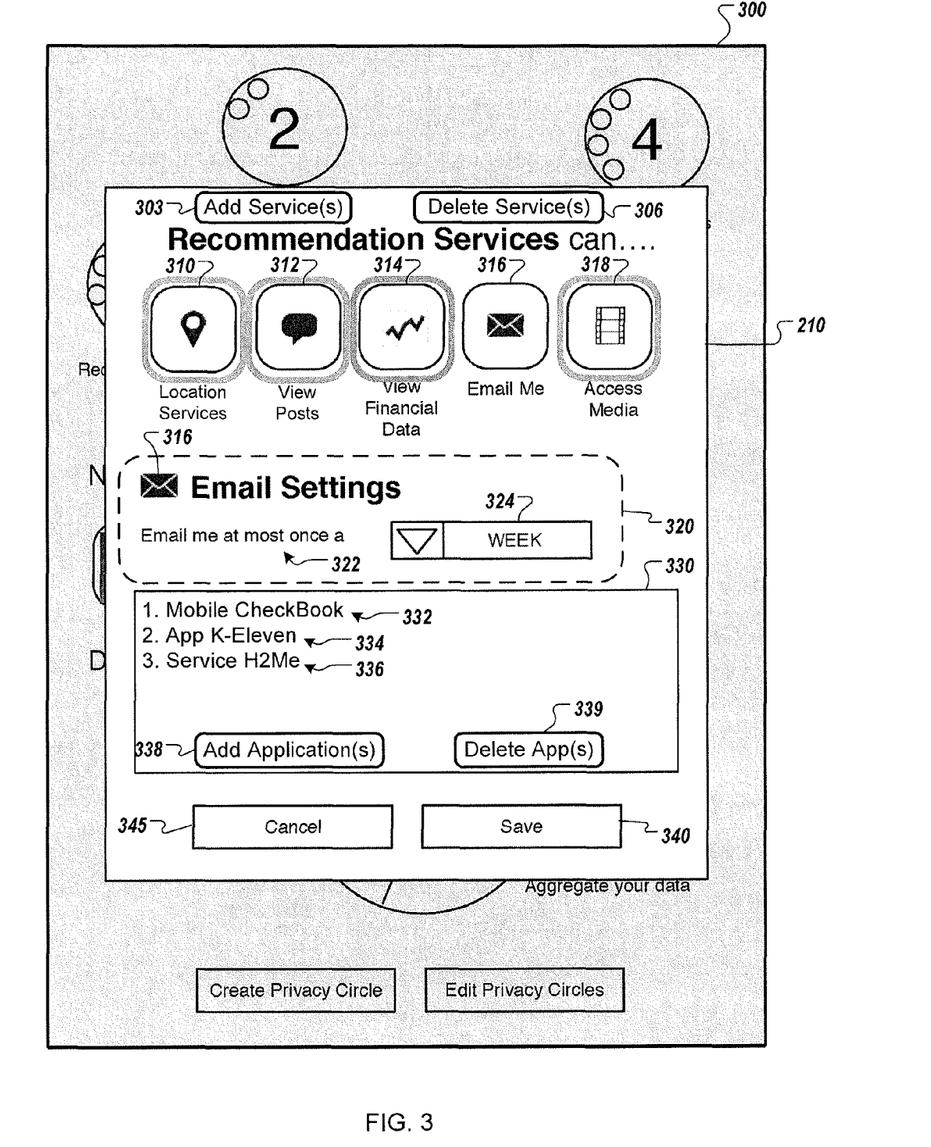
FIG. 3 shows example features of the user interface of FIG. 2.

FIG. 3 shows example features of the user interface of FIG. 2. User interface 300 allows users to create, edit, or otherwise define a service profile (or privacy circle in this example). As an example, UI 300 is shown being used to edit the "Recommendation Services" privacy circle 210.

Any number of services and/or data streams may be included in a privacy circle. For example, a user may click on the "Add Service(s)" button 303 to identify or select one or more services and/or data streams for inclusion in the "Recommendation Services" privacy circle (e.g., services and/or data streams 310-318 may be included by pressing this button). For illustration, if the user wants to add another service (e.g., "Calendar Services," not shown), the user may press on button 303, one or more services available to be included may be provided for the user to select, the user then selects one or more of the available services, the press on a "Done" button (not shown). The "Delete Service(s)" button 306 may be used to delete one or more services already included in the profile.

Users can use UI 300 to define (e.g., based on privacy settings) boundaries of each of the one or more services and/or data streams 310-318. For example, a user can click on data stream 316 labeled as "Email Me" to define its boundaries in the "Recommendation Services" privacy circle 210. Defining boundaries of a data steam or service defines the category of data or service. Category definition is shown in area 320, which includes in this example, email frequency label 322 and email frequency selection 324.

In some implementations, UI 300 may include other controls or widgets (not shown) based on the selected data stream or service. For example, in data stream 316, which is related to the email data, one or more widgets may be included to allow a user to select the type of email messages (e.g., incoming and/or outgoing email messages) to be included as data stream "Email Me" 316.

A user may define the category of each of the services and/or data streams 310-314 and 318 as described above with data stream 316. For example, the user may define the boundaries of data stream "View Posts" 312 to limit to reading and commenting but not posting on behalf of the user; define the boundaries of the location services 310 labeled "Location Services" to only share location data during work days between 9:00 AM and 6:00 PM local time; define the boundaries of data stream 314 labeled "View Financial Data" to only allow viewing of the user's financial data but not viewing transaction data; and define the boundaries of data stream "Access Media" 318 to allow access of photo data but not video and audio data.

In some implementations, UI 300 may include an area 330 that shows which third-party applications 332-336 have been associated with the "Recommendation Services" privacy circle 210. By associating a third-party application 332, 334, or 336 with a privacy circle, a user grants that third-party application access to the services and/or data streams 310-318 included in the privacy circle. The access to the services and/or data streams 310-318 is limited by the boundaries or category defined in the privacy circle.

In some implementations, a third-party application or application may be associated with a service profile using "Add Application(s)" button 338. For example, a user may associate an unassociated third-party application (e.g., one shown in area 220, FIG. 2) with privacy circle 210 by pressing button 338. After which, a selection window may appear listing "App X," "Product Y," and "Service Z" 220 for the user to select from. The user may select one or more applications from the list (e.g., "Product Y") to associate with privacy circle 210. The result may be shown as adding "4. Product Y" (not shown) below "3. Service H2Me" 336.

The association of any third-party applications 332-336 may be removed by, for example, selecting that third-party application and clicking on the "Delete App(s)" button 339.

For simplification and clarity, the FIG. 3 example is illustrated with third-party applications 332-336. However, the example implementations described herein, including FIG. 3, are not limited to third-party applications. Applications, services, and/or products of any party (e.g., those of first party and/or second party) may be included. In some implementations, applications provided by third parties and non-third parties may be associated with a service profile. In some implementations, a service profile may be created for associating exclusively with third-party applications.

Figure 4:
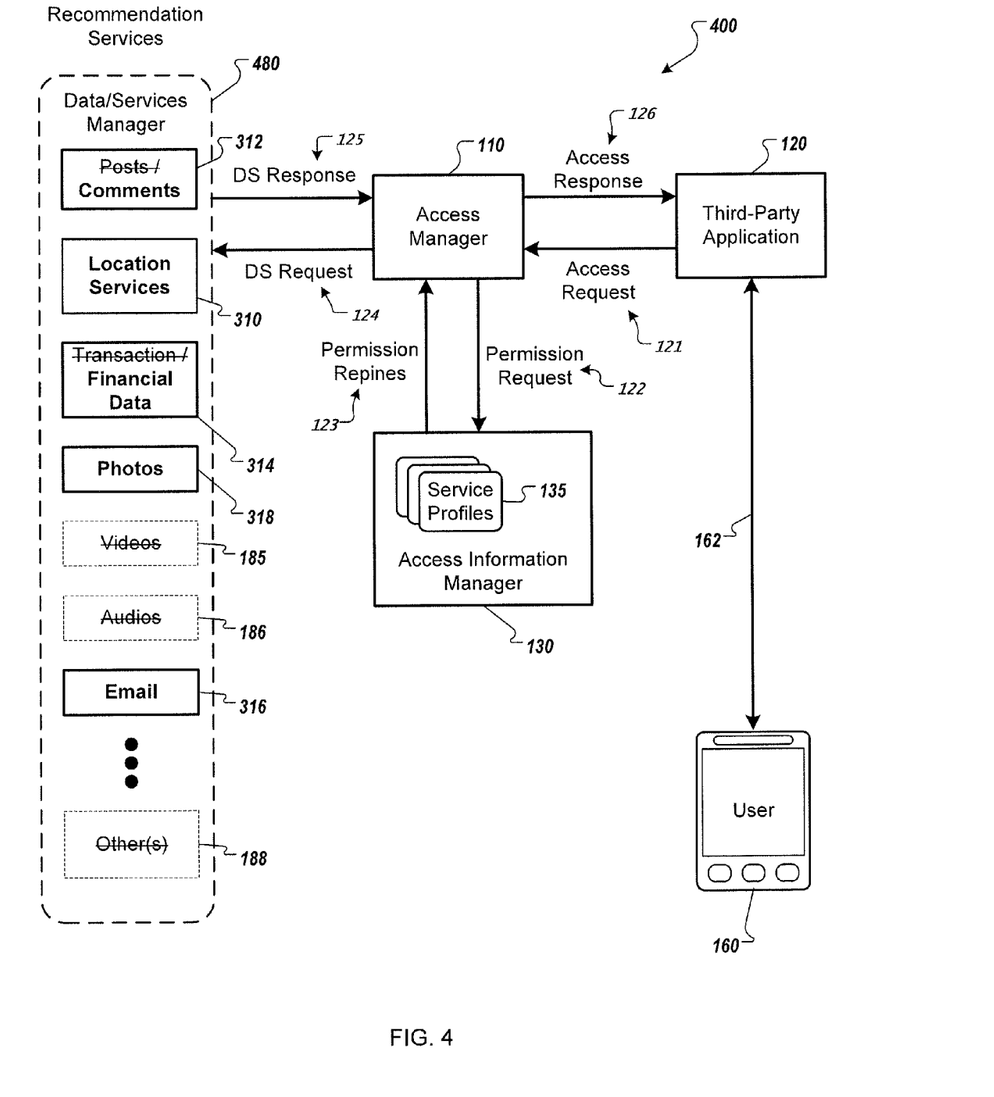
FIG. 4 shows the data flow diagram of FIG. 1 based on an example customization with the user interface of FIG. 3

FIG. 4 shows the data flow diagram of FIG. 1 based on an example service profile defined in the user interface of FIG. 3. Environment 400 is environment 100A, FIG. 1, where the third-party application 120 may be one of the third-party applications 332-336 (e.g., Mobile CheckBook 332). Access manager 110 receives access request 121 from Mobile CheckBook 332 (e.g., third-party application 120) and sends permission request 122, including a Service ID of Mobile CheckBook 332, to access information manager 130. Based, at least in part, on the Service ID, access information manager 130 returns a service profile 135 that is the privacy circle "Recommendation Services" 210 defined in FIG. 3.

The privacy circle "Recommendation Services" 210 defines services and/or data streams 310-318, as shown with data/service 480, for allowing access by associated third-party applications (e.g., Mobile CheckBook 332). Data/services manager 480 shows that Mobile CheckBook 332 can access comments data 312 (e.g., "View Posts" of a social network) not posting on behalf of the user; can access location services 310 (but only during work days between 9:00 AM and 6:00 PM local time as defined above); can access financial data 314 but not transaction data; can access photo data 318 but not video data 185 and audio data 186; and can access email data/service 316 (but only email the user at most once a week as defined above).

A third-party application 120 (e.g., Mobile CheckBook 332) may request to access a user's data in real-time or on demand (e.g. in response to a user's request for service through communication link 162). In some implementations, a third-party application 120 may be permitted to make asynchronous access to users' data (e.g., at any time). For example, access requests can be made by some automated back-end system of a third-party application 120. Users' data retrieved asynchronously may be stored and/or aggregated by the third-party application 120 and used in providing services to users.

Access to users' data may be governed by rules and/or policies. For example, there may be a rule against using users' data that is not related to providing services to the users. For example, a third-party application may not use the data of one user to gain business from another user or to provide services to another user. Many different rules and/or policies are possible depending on implementations of the data/services manager 180 and agreements with third-party applications. There may be rules and/or policies applicable to one third-party application but not to another third-party application.

Figure 5:
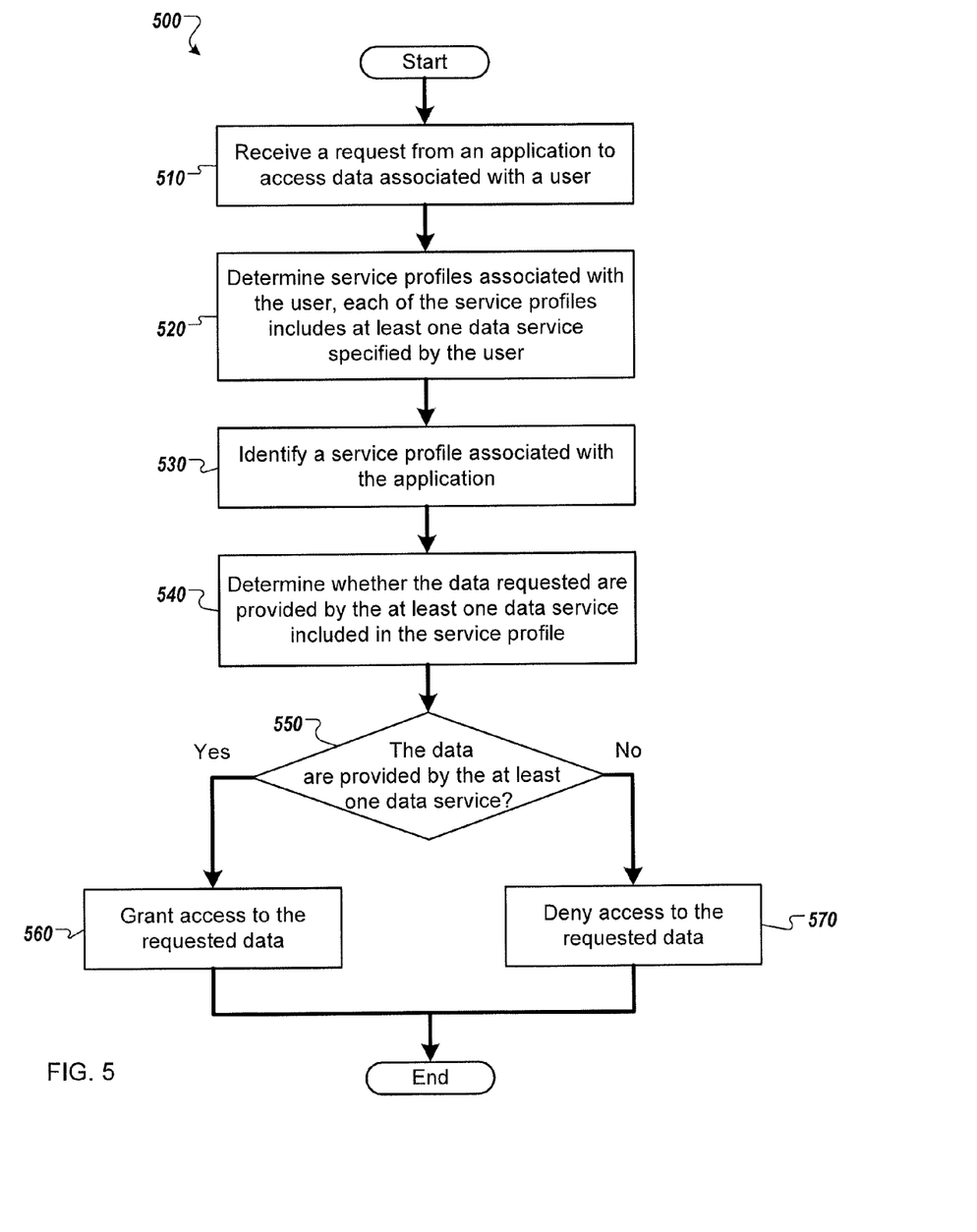
FIG. 5 shows an example of a process implementation.

FIG. 5 shows an example of a process implementation. Process 500 may start with block 510 where a request from an application (e.g., access request 121, FIG. 1) to access data associated with a user is received (e.g., by access manager 110) from an application (e.g., third-party application 120). At block 520, service profiles associated with the user are determined, and each of the service profile may include one or more data service or category of data specified or defined by the user. At block 530, one or the service profiles 135 is identified with at least the application associated with it. The association may be created by the user (e.g., the user dragging an icon representing the application over another icon representing the service profile). The service profile 135 may be identified by access information manager 130 or by access manager 110, which sends a permission request 122 and receives a permission response 124. At block 540, access manager 110 or another device or module may determine whether the data requested by the application are provided by the at least one data service included in the service profile. If the determination result at 550 is positive (e.g., "Yes"), grant the application access to the data associated with the user at block 560. If the determination result at 550 is negative (e.g., "No"), deny the application access to the data associated with the user at block 570. Different examples of granting and denying access are described in FIG. 1 above, but are not limited to those described in FIG. 1.

In some examples, process 500 may be implemented with different, fewer, or more blocks. Process 500 may be implemented as computer executable instructions, which can be stored on a medium, loaded onto one or more processors of one or more computing devices, and executed as a computer-implemented method.

Figure 6:
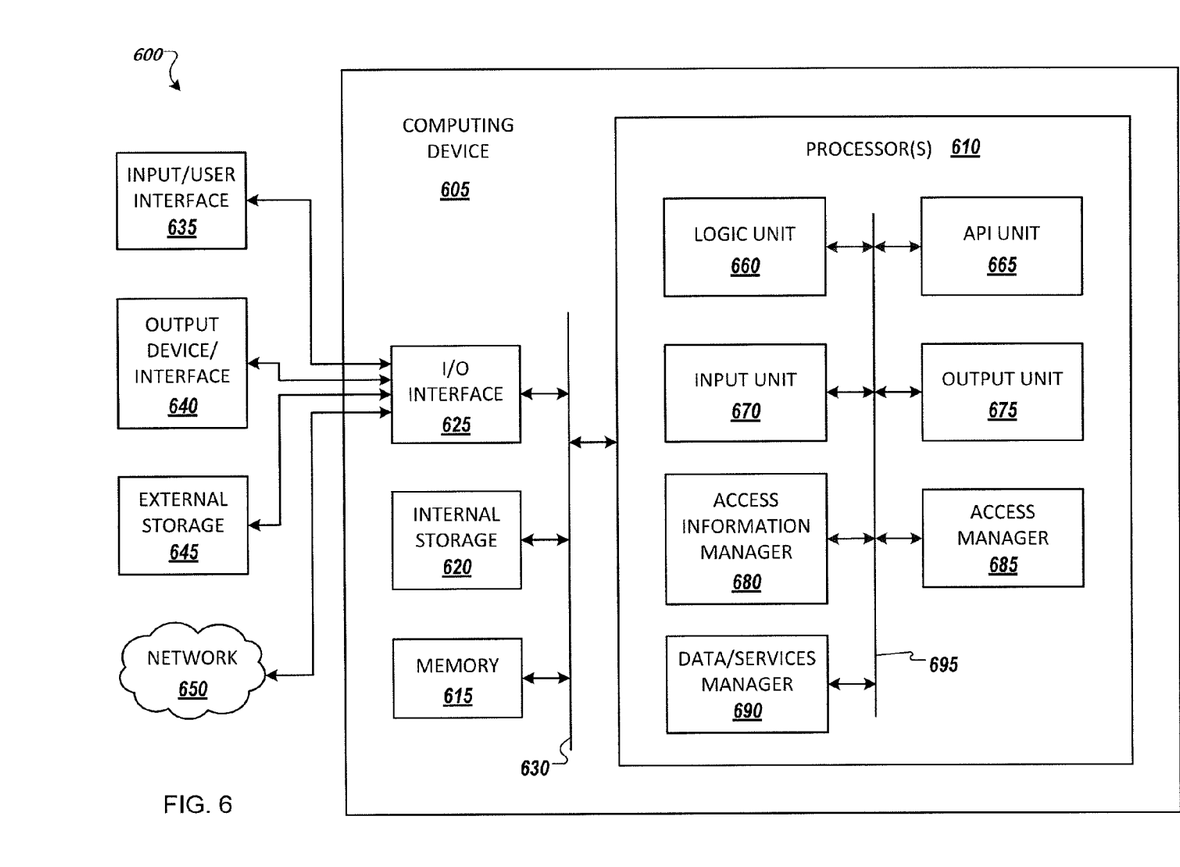
FIG. 6 shows an example computing environment with an example computing device suitable for implementing at least one example embodiment.

FIG. 6 shows an example computing environment with an example computing device suitable for implementing at least one example embodiment. Computing device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computing device 605.

Computing device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example embodiments, input/user interface 635 and output device/interface 640 can be embedded with or physically coupled to the computing device 605. In other example embodiments, other computing devices may function as or provide the functions of input/user interface 635 and output device/interface 640 for a computing device 605.

Examples of computing device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 605 can be communicatively coupled (e.g., via I/O interface 625) to external storage 645 and network 650 for communicating with any number of networked components, devices, and systems, including one or more computing devices of the same or different configuration. Computing device 605 or any connected computing device can be functioning as, providing services of, or referred to as a server, client, thin server, general machine, special-purpose machine, or another label.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions to implement at least one embodiment (e.g., a described embodiment). Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. To implement a described embodiment, one or more applications can be deployed that include logic unit 660, application programming interface (API) unit 665, input unit 670, output unit 675, access information manager 680, access manager 685, data/services manager 690, and inter-unit communication mechanism 695 for the different units to communicate with each other, with the OS, and with other applications (not shown). For example, access information manager 680, access manager 685, and data/services manager 690 may implement one or more systems and processes shown in FIGS. 1D, 4 and 5. The described units and elements can be varied in design, function, configuration, or implementation and are not limited to the descriptions provided.

In some example embodiments, when information or an execution instruction is received by API unit 665, it may be communicated to one or more other units (e.g., logic unit 660, input unit 670, output unit 675, access information manager 680, access manager 685, and data/services manager 690). For example, an access request 121 may be received by access manager 685, which communicates via API unit 665 with access information manager 680 to determine whether to grant access to the request. If the determination is granting access, access manager 685 may communicate, using API unit 665, with data/services manager 690 to full fill the access request 121.

In some examples, logic unit 660 may be configured to control the information flow among the units and direct the services provided by API unit 665, input unit 670, output unit 675, access information manager 680, access manager 685, and data/services manager 690 in order to implement an embodiment described above. For example, the flow of one or more processes or implementations may be controlled by logic unit 660 alone or in conjunction with API unit 665.

Although a few example embodiments have been shown and described, these example embodiments are provided to convey the subject matter described herein to people who are familiar with this field. It should be understood that the subject matter described herein may be embodied in various forms without being limited to the described example embodiments. The subject matter described herein can be practiced without those specifically defined or described matters or with other or different elements or matters not described. It will be appreciated by those familiar with this field that changes may be made in these example embodi-

What is claimed is:

1. A computer-implemented method comprising:
receiving, via an access manager at one or more computing devices, a request from one of a plurality of third-party applications to access data associated with a user;
determining, using the one or more computing devices, that a first service profile and a second service profile are associated with the user, wherein the first service profile includes at least one data service specified by the user and controls access of the third party application to the data associated with the user, based on a user-defined categorization of the data into one or more groups for the at least one data service and a user-defined association of the first service profile with the third-party application, and the second service profile includes at least another data service specified by the user;
identifying, via at least one of the access manager and an access information manager at the one or more computing devices, that the first service profile is associated, by the user, with at least the third-party application;
determining, via the access manager at the one or more computing devices, whether the data requested by the third-party application is provided by the at least one data service included in the first service profile, based on the user-defined categorization and the user-defined association of the first service profile, as identified by the access manager or the access information manager;
performing, via the access manager at the one or more computing devices, an action with respect to an access by the third-party application to the data, based on a result of the determining; and
providing, by the one or more computing devices, a user interface that displays an identity of the third-party applications and an indication of whether each of the third-party applications are associated with each of the first service profile and the second service profile, wherein the user interface provides a first option for the user to associate or disassociate the third-party applications with respect to the first service profile or the second service profile, and a second option for the user to define a boundary of a data stream to limit the access by the third party applications associated with the first service profile or the second service profile to the data, based on a type of the access or a degree of the access.

2. The method of claim 1, wherein the second service profile is associated with at least another third-party application, which is mutually exclusive from the at least the third-party application associated with the first service profile.

3. The method of claim 1, further comprising:
passing through, via the access manager at the one or more computing devices, the request from the third-party application to a server after the receiving the request from the third-party application.

4. The method of claim 1, wherein the identifying, using the one or more computing devices, the first service profile, comprises the access manager receiving the first service profile based on an identifier associated with the at least the third-party application.

5. The method of claim 1, wherein the identifying, using the one or more computing devices, the first service profile, comprises the access manager identifying the first service profile from a cache.

6. The method of claim 1, wherein the at least one data service includes one or more boundaries defined by the user and can be redefined by the user.

7. The method of claim 1, wherein the performing, using the one or more computing devices, the action with respect to the access by the third-party application to the data requested comprises passing through, via the access manager at the one or more computing devices, the request from the third-party application to a server controlling access to the data requested.

8. The method of claim 1, wherein the performing, using the one or more computing devices, the action with respect to the access by the third-party application to the data requested comprises returning an error code to the third-party application.

9. The method of claim 1, wherein the performing the action comprises:
granting access by the third-party application to the data requested when the data requested by the third-party application are provided by the at least one data service; or
denying access by the third-party application to the data requested when the data requested by the third-party application are not provided by the at least one data service.

10. The method of claim 1, further comprising providing an interface for the user to create, define, view, modify or delete the first service profile associated with the third-party application and the second service profile associated with another third-party application.

11. A non-transitory computer readable medium having stored therein computer executable instructions for:
receiving, via an access manager at one or more computing devices, a request from a third-party application to access data associated with a user;
determining, using the one or more computing devices, that a service profile and second service profile are associated with the user, wherein the first service profile includes at least one data service specified by the user and controls access of the third party application to the data associated with the user, based on a user-defined categorization of the data into one or more groups for the at least one data service and a user-defined association of the first service profile with the third-party application, and the second service profile includes at least another data service specified by the user;
identifying, via at least one of the access manager and an access information manager at the one or more computing devices, that the first service profile has been associated, by the user, with at least the third-party application;
determining, via the access manager at the one or more computing devices, whether the data requested by the third-party application is provided by the at least one data service included in the first service profile, based on the user-defined categorization and the user-defined association of the first service profile, as identified by the access manager or the access information manager;
performing, via the access manager at the one or more computing devices, an action with respect to an access by the third-party application to the data, based on a result of the determining; and providing, by the one or more computing devices, a user interface that displays an identity of the third-party applications and an indication of whether each of the third-party applications are associated with each of the first service profile and the second service profile, wherein the user interface provides a first option for the user to associate or disassociate the third-party applications with respect to the first service profile or the second service profile, and a second option for the user to define a boundary of a data stream to limit the access by the third party applications associated with the first service profile or the second service profile to the data, based on a type of the access or a degree of the access.

12. The computer readable medium of claim 11, wherein the second service profile is associated with at least another third-party application, which is mutually exclusive from the at least the third-party application associated with the first service profile.

13. The computer readable medium of claim 11, wherein the identifying, using the one or more computing devices, the first service profile comprises the access manager receiving the first service profile based on an identifier associated with the at least the third-party application.

14. The computer readable medium of claim 11, wherein the at least one data service includes one or more boundaries defined by the user and can be redefined by the user.

15. The computer readable medium of claim 11, wherein the performing, using the one or more computing devices, the action with respect to the access by the third-party application to the data requested comprises passing through, via the access manager at the one or more computing devices, the request from the third-party application to a server controlling access to the data requested.

16. The computer readable medium of claim 11, wherein the performing, using the one or more computing devices, the action with respect to the access by the third-party application to the data requested comprises the access manager returning an error code to the third-party application.

17. At least one computing device comprising:
storage and at least one hardware processor configured to perform:
receiving, via an access manager at the at least one computing device, a request from a third-party application to access data associated with a user;
determining, using the at least one computing device, that a service profile and second service profile are associated with the user, wherein the first service profile includes at least one data service specified by the user and controls access of the third party application to the data associated with the user, based on a user-defined categorization of the data into one or more groups for the at least one data service and a user-defined association of the first service profile with the third-party application, and the second service profile includes at least another data service specified by the user;
identifying, via at least one of the access manager and an access information manager at the at least one computing device, the first service profile has been associated, by the user, with at least the third-party application;
determining, via the access manager at the at least one computing device, whether the data requested by the third-party application is provided by the at least one data service included in the first service profile, based on the user-defined categorization and the user-defined association of the first service profile, as identified by the access manager or the access information manager;
performing, via the access manager at the at least one computing device, an action with respect to an access by the third-party application to the data, based on a result of the determining; and
providing, by the one or more computing devices, a user interface that displays an identity of the third-party applications and an indication of whether each of the third-party applications are associated with each of the first service profile and the second service profile, wherein the user interface provides a first option for the user to associate or disassociate the third-party applications with respect to the first service profile or the second service profile, and a second option for the user to define a boundary of a data stream to limit the access by the third party applications associated with the first service profile or the second service profile to the data, based on a type of the access or a degree of the access.

18. The at least one computing device of claim 17, wherein the second service profile is associated with at least another third-party application, which is mutually exclusive from the at least the third-party application associated with the first service profile.

19. The at least one computing device of claim 17, wherein the identifying, via at least one of the access manager and an access information manager at the at least one computing device, the first service profile comprises receiving the first service profile based on an identifier associated with the at least the third-party application.

20. The at least one computing device of claim 17, wherein the at least one data service includes one or more boundaries defined by the user and can be redefined by the user.

21. The at least one computing device of claim 17, wherein the performing, using the at least one computing device, the action with respect to the access by the third-party application to the data requested comprises passing through, via the access manager at the one or more computing devices, the request from the third-party application to a server controlling access to the data requested.

* * * * *